(12) United States Patent
Frederick et al.

(10) Patent No.: US 10,525,871 B2
(45) Date of Patent: Jan. 7, 2020

(54) VEHICLE LAMP ASSEMBLIES INCLUDING LIGHT DIVERTING SYSTEM AND APPARATUS

(71) Applicant: Toyota Motor Engineering & Manufacturing North America, inc., Erlanger, KY (US)

(72) Inventors: Scott L. Frederick, Brighton, MI (US); Scott P. Robison, Dexter, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 15/901,988

(22) Filed: Feb. 22, 2018

(65) Prior Publication Data

US 2019/0255988 A1    Aug. 22, 2019

(51) Int. Cl.
| | |
|---|---|
| *B60Q 1/24* | (2006.01) |
| *H04N 7/18* | (2006.01) |
| *H04N 5/232* | (2006.01) |
| *F21S 41/675* | (2018.01) |
| *B60Q 1/04* | (2006.01) |
| *B60Q 1/22* | (2006.01) |
| *B60R 1/00* | (2006.01) |

(52) U.S. Cl.
CPC ............. *B60Q 1/24* (2013.01); *B60Q 1/0425* (2013.01); *B60Q 1/22* (2013.01); *B60R 1/00* (2013.01); *F21S 41/675* (2018.01); *H04N 5/23296* (2013.01); *H04N 7/183* (2013.01); *B60Q 2900/30* (2013.01)

(58) Field of Classification Search
CPC combination set(s) only.
See application file for complete search history.

(56) References Cited

U.S. PATENT DOCUMENTS

| | | | |
|---|---|---|---|
| 1,525,114 A | 2/1925 | Yoscary | |
| 1,528,562 A | 3/1925 | Parkhurst | |
| 1,723,863 A | 8/1929 | Jeffrey | |
| 2,483,202 A | 9/1949 | Jackson | |
| 2012/0081915 A1* | 4/2012 | Foote | B60R 1/12 362/494 |
| 2017/0192224 A1* | 7/2017 | Logiudice | H05B 33/0854 |
| 2017/0337821 A1* | 11/2017 | Masuda | B60Q 1/00 |
| 2018/0170242 A1* | 6/2018 | Wang | B60Q 1/06 |
| 2018/0339644 A1* | 11/2018 | Kim | F21S 41/663 |

FOREIGN PATENT DOCUMENTS

| | | |
|---|---|---|
| GB | 322407 | 12/1929 |
| GB | 396451 | 8/1933 |

* cited by examiner

*Primary Examiner* — Janese Duley
(74) *Attorney, Agent, or Firm* — Dinsmore & Shohl LLP

(57) ABSTRACT

A light diverting system for diverting light from a headlamp assembly of a vehicle includes a processor and a user input device communicatively coupled to the processor. A light diverting apparatus includes an actuator communicatively coupled to the processor and a light diverting member comprising a reflective surface configured to reflect light from a light source. A memory module is communicatively coupled to the processor that stores logic that, when executed by the processor, causes the system to receive user instructions from the user input device and adjust a position of the light diverting member using the light diverting apparatus based on the user instructions.

17 Claims, 4 Drawing Sheets

VEHICLE LAMP ASSEMBLIES INCLUDING LIGHT DIVERTING SYSTEM AND APPARATUS

TECHNICAL FIELD

The present specification generally relates to vehicle lamp assemblies, and more specifically, vehicle lamp assemblies that include light diverting systems for diverting light originating from a headlamp assembly.

BACKGROUND

Vehicles commonly include lamp assemblies that can provide a number of functions. Headlamp assemblies, for example, in addition to a primary lighting function with a low headlamp beam and a high headlamp beam, may also include other lighting functions, such as daytime running light (DRL) functions and turn functions. However, the primary lighting functions of the headlamp assemblies may be limited generally to forward-facing illumination. Further, many vehicles may have limited illumination along their sides or outwardly from the sides.

Accordingly, a need exists for vehicle lamp assemblies that include light diverting systems for diverting light originating from a headlamp assembly.

SUMMARY

In one embodiment, a light diverting system for diverting light from a headlamp assembly of a vehicle includes a processor and a user input device communicatively coupled to the processor. A light diverting apparatus includes an actuator communicatively coupled to the processor and a light diverting member comprising a reflective surface configured to reflect light from a light source. A memory module is communicatively coupled to the processor that stores logic that, when executed by the processor, causes the system to receive user instructions from the user input device and adjust a position of the light diverting member using the light diverting apparatus based on the user instructions.

In another embodiment, a vehicle includes a processor and a user input device communicatively coupled to the processor. A headlamp assembly includes a light source. A light diverting apparatus includes an actuator communicatively coupled to the processor and a light diverting member comprising a reflective surface configured to reflect light from the light source. A memory module is communicatively coupled to the processor that stores logic that, when executed by the processor, causes the system to receive user instructions from the user input device and adjust a position of the light diverting member using the light diverting apparatus based on the user instructions.

In another embodiment, a method for diverting light from a headlamp assembly of a vehicle is provided. The method includes receiving user instructions from a user input device. A position of a light diverting member is adjusted using a light diverting apparatus based on the user instructions. The light diverting member includes a reflective surface configured to reflect light from a light source of the headlamp assembly.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Vehicles according to the present specification include vehicle lamp assemblies that include light diverting systems for diverting light originating from a headlamp assembly. The vehicle lamp assemblies generally include headlamp assemblies, such as a first headlamp assembly at a driver side and a second headlamp assembly at a passenger side. The vehicle lamp assemblies may also include a first rear position lamp at the driver side and a second rear position lamp assembly at the passenger side. The vehicle lamp assemblies may include other lamp assembly types depending, at least in part, on the styling of the vehicles and any modifications.

The vehicle lamp assemblies include the light diverting systems. The light diverting systems include a light diverting apparatus that includes a light diverting member that can be used to divert a light ray from, for example, one of the headlamp assemblies from a first direction having an angle of incidence to the light diverting member to a second, different direction that has an angle of reflection from the light diverting member. The light diverting apparatus may be operably connected to the vehicle and be electronically controlled by an operator, a controller or both using an actuator to place the light diverting member in one or more positions in order to achieve the desired angle of reflection, as will be described in greater detail below. The light diverting systems can be used to redirect at least some of the light in a desired direction to illuminate selected regions around the vehicle.

Figure 1:
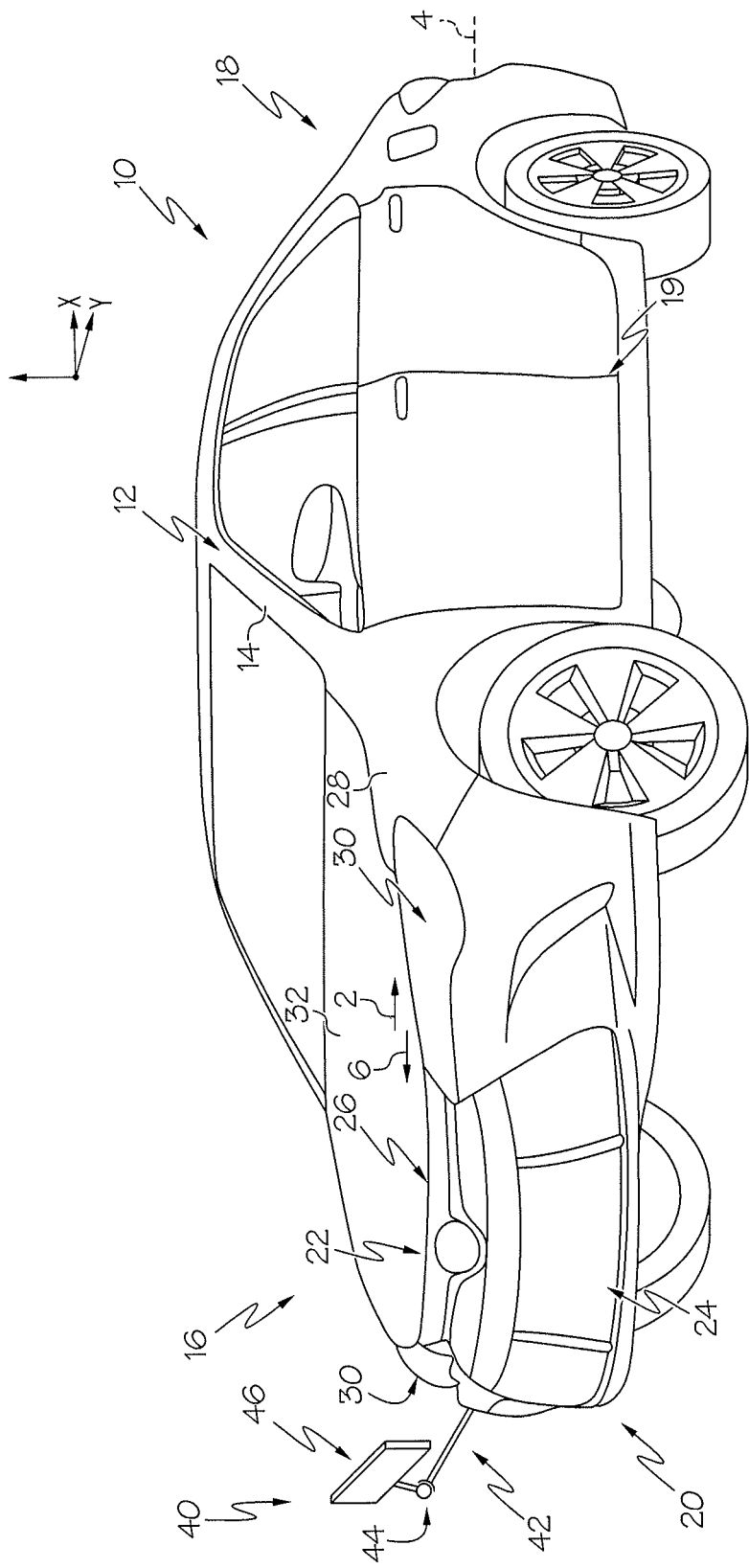
FIG. 1 schematically depicts a perspective view of a vehicle including a light diverting system and light diverting apparatus according to one or more embodiments shown or described herein.

As used herein, the term "vehicle longitudinal direction" refers to the forward-rearward direction of the vehicle (i.e., in the +/− vehicle X-direction depicted in FIG. 1). The term "vehicle lateral direction" refers to the cross-vehicle direction (i.e., in the +/− vehicle Y-direction depicted in FIG. 1), and is transverse to the vehicle longitudinal direction. The term "vehicle vertical direction" refers to the upward-downward direction of the vehicle (i.e., in the +/− vehicle Z-direction depicted in FIG. 1). Further, the terms "inboard," "inward," "outboard" and "outward" are used to describe the relative positioning of various components of the vehicle. Referring to FIG. 1, the terms "outboard" or "outward" as used herein refers to the relative location of a component in direction 2 with respect to a vehicle centerline 4. The term "inboard" or "inward" as used herein refers to the relative location of a component in direction 6 with respect to the vehicle centerline 4. Because the vehicle structures may be generally symmetrical about the vehicle centerline 4, the direction to which use of terms "inboard," "inward," "outboard" and "outward" refer may be mirrored about the vehicle centerline 4 when evaluating components positioned along opposite sides of the vehicle 10.

The vehicle 10 includes a vehicle body 12 including a body framework 14 and having a front 16, a rear 18 and sides 19 that extend between the front 16 and the rear 18. The vehicle 10 includes a front end assembly 20 at the front 16 of the vehicle body. The front end assembly 20 includes an upper bumper cover portion 22 that extends in a vehicle-lateral direction of the vehicle 10. The front end assembly 20 may further include a lower grille assembly 24 and an upper grille assembly 26 with the upper bumper cover portion 22 disposed therebetween. The vehicle 10 may also include front fenders 28 disposed at opposite sides of the upper grille assembly 26 and the lower grille assembly 24 with headlamp assemblies 30. A hood 32 may be located above the upper grille assembly 26 that provides a cover for an engine compartment.

Motor vehicles that incorporate elements according to the present disclosure may include a variety of construction methodologies that are conventionally known, including a unibody construction methodology as well as a body-on-frame construction methodology. Furthermore, the Figures may only show one side of the vehicle. Descriptions of the other side of the vehicle may be omitted because both sides of the vehicle may be laterally symmetrical and substantially the same.

The vehicle 10 further includes a light diverting system, generally indicated as element 40 that includes a light diverting apparatus 42. The light diverting apparatus 42 includes a light diverting member 44. The light diverting member 44 includes a reflective surface 46, such as a mirror surface that can be used to reflect light toward a desired direction.

Figure 2:
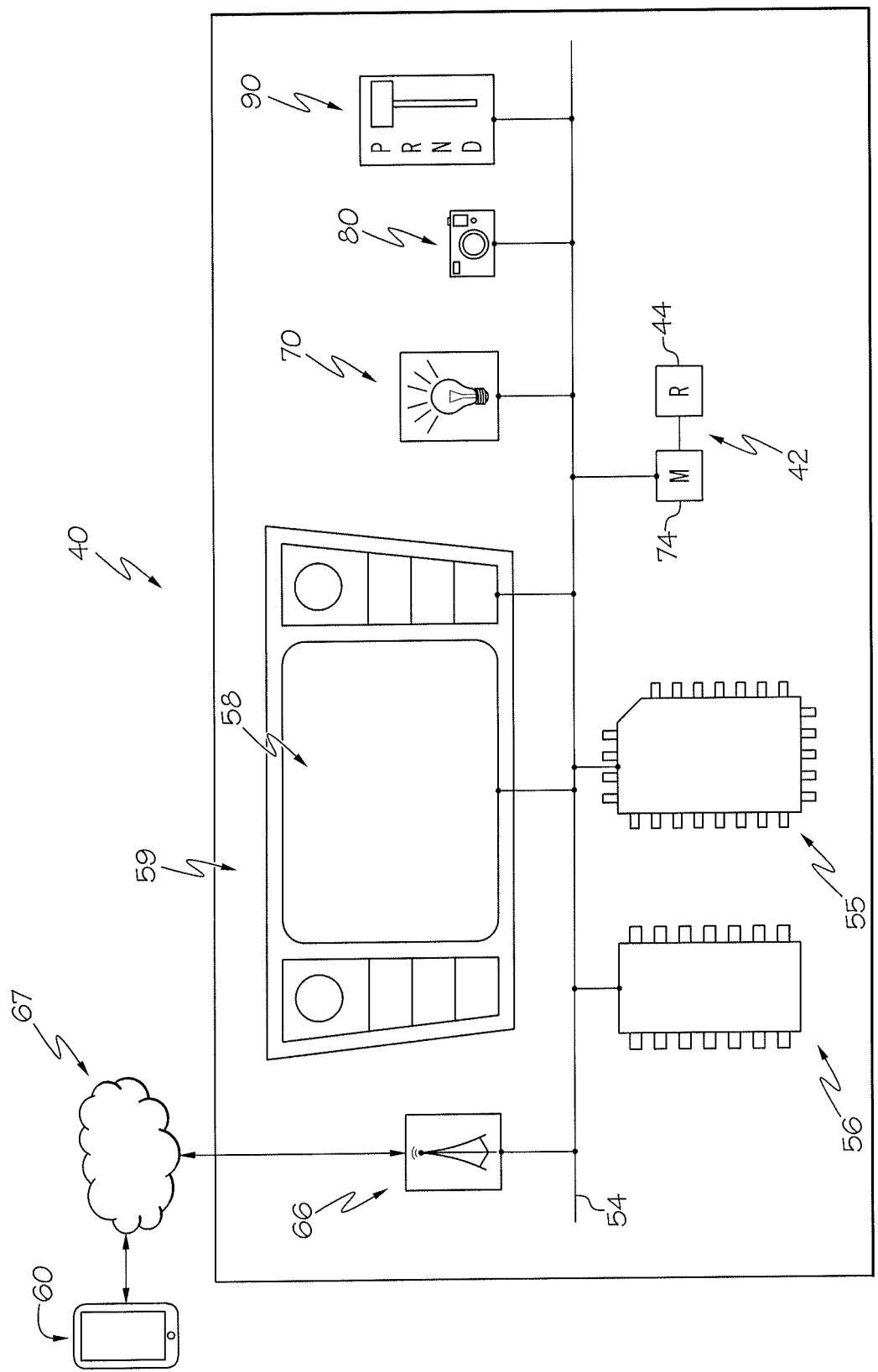
FIG. 2 schematically depicts the light diverting system of the vehicle of FIG. 1, according to one or more embodiments shown and described herein.

Referring to FIG. 2, the light diverting system 40 of the vehicle 10 is illustrated schematically. The light diverting system 40 includes a communication path 54, a processor 55, a memory module 56, a light source 70, the light diverting apparatus 42 and a user input device 59. The light diverting system 40 may further include a camera 80, a display 58, network interface hardware 66, and a drive mode sensor 90. It is noted that, while the vehicle 10 may be depicted herein as an automobile, the vehicle 10 may be any passenger vehicle such as, for example, a terrestrial, aquatic, and/or airborne vehicle.

The light diverting system 40 includes the communication path 54 that provides data interconnectivity between various modules disposed within the light diverting system 40. Specifically, each of the modules can operate as a node that may send and/or receive data. In some embodiments, the communication path 54 includes a conductive material that permits the transmission of electrical data signals to processors, memories, sensors, and actuators throughout the light diverting system 40. In some embodiments, the communication path 54 can be a bus, such as for example a LIN bus, a CAN bus, a VAN bus, and the like. In further embodiments, the communication path 54 may be wireless and/or an optical waveguide. Components that are communicatively coupled may include components capable of exchanging data signals with one another such as, for example, electrical signals via conductive medium, electromagnetic signals via air, optical signals via optical waveguides, and the like.

The light diverting system 40 includes the processor 55 communicatively coupled with the memory module 56 over the communication path 54. The processor 55 may include any device capable of executing machine-readable instructions stored on a non-transitory computer-readable medium. The processor 55 may include one or more processors. Accordingly, each processor 55 may include a controller, an integrated circuit, a microchip, a computer, and/or any other computing device.

The memory module 56 is communicatively coupled to the processor 55 over the communication path 54. The memory module 56 may be configured as volatile and/or nonvolatile memory and, as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the light diverting system 40 and/or external to the light diverting system 40. The memory module 56 may be configured to store one or more pieces of logic, as described in more detail below. The memory module 56 may include one or more memory modules. The embodiments described herein may utilize a distributed computing arrangement to perform any portion of the logic described herein.

Embodiments of the present disclosure include logic stored on the memory module 56 that includes machine-readable instructions and/or an algorithm written in any programming language of any generation (e.g., 1GL, 2GL, 3GL, 4GL, and/or 5GL) such as, machine language that may be directly executed by the processor 55, assembly language, object-oriented programming (OOP), scripting languages, microcode, etc., that may be compiled or assembled into machine readable instructions and stored on a machine readable medium. Similarly, the logic and/or algorithm may be written in a hardware description language (HDL), such as logic implemented via either a field-programmable gate array (FPGA) configuration or an application-specific integrated circuit (ASIC), and their equivalents. Accordingly, the logic may be implemented in any conventional computer programming language, as pre-programmed hardware elements, and/or as a combination of hardware and software components.

As noted above, the light diverting system 40 utilizes the light source 70. The light source 70 may be part of the headlamp assembly 30 described above. The light source 70 may include a plurality of light sources. The light source 70 is coupled to the communication path 54 and communicatively coupled to the processor 55. The light source 70 may be any device capable of outputting light, such as but not limited to a light emitting diode, an incandescent light, a fluorescent light, and/or the like.

The light diverting system 40 further includes the light diverting apparatus 42. The light diverting apparatus 42 may include an actuation device 74 and the light diverting member 44. The actuation device 74 may include one or more actuators that can be used to move the light diverting member 44 to a desired position. The actuation device 74 can be coupled to the communication path 54 and communicatively coupled to the processor 55 to control movement and positioning of the light diverting member 44, as will be described in greater detail below.

Figure 3:
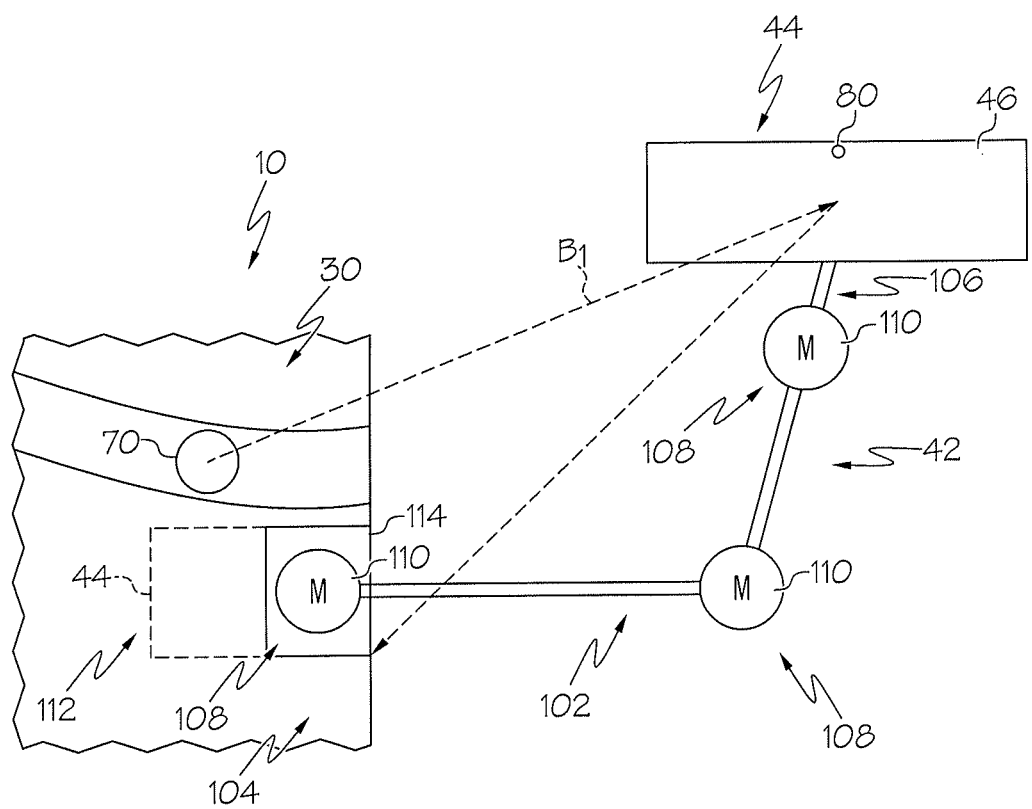
FIG. 3 schematically depicts the light diverting apparatus of FIG. 1 in operation, according to one or more embodiments shown and described herein.

Referring to FIG. 3, the vehicle 10 including the light diverting apparatus 42 is illustrated schematically in greater detail. As described above, the light diverting apparatus 42 may generally be connected to and extend from the front 16 of the vehicle body 12. The light diverting apparatus 42 may include an actuation arm 102 and the light diverting member 44 that is connected to the actuation arm 102. The actuation arm 102 may include a proximal end 104 that is connected to the vehicle 10 and a distal end 106 that is connected to the light diverting member 44. In some embodiments, the actuation arm 102 may include a number of articulating locations 108. For example, the actuation arm 102 may have two or more articulating locations, such as three or more articulating locations or more. The articulating locations 108 may include any suitable articulating structures, such as hinge joints, pivot joints, ball joints or combinations thereof. The actuation device 74 may include one or more of the actuators 110 that can be used to move the actuation arm 102 in various directions. Linear movement of the actuation arm 102 (e.g., telescopic or otherwise) may also be provided. In some embodiments, the articulating locations 108 may be manually moveable to articulate the actuation arm 102 such that the actuation arm 102 maintains a desired position.

FIG. 3 also illustrates the light diverting apparatus 42 in a stowed configuration, shown by dotted lines. In some embodiments, the vehicle 10 may include a housing 112 that is sized and located to receive the actuation arm 102 and the light diverting member 44 therein. For example, when not in use, the actuators 110 may move the actuation arm 102 and the light diverting member 44 into the housing 112. In some embodiments, the actuation arm 102 and light diverting member 44 may be moved manually into the housing 112. Further, a door, represented by line 114 may be provide to close the housing 112 and inhibit access to the light diverting apparatus 42. The door 114 may be moved automatically and/or manually between open and closed configurations.

Referring again to FIG. 2, the light diverting system 40 includes the user input device 59 coupled to the communication path 54 such that the communication path 54 communicatively couples the user input device 59 to other modules of the light diverting system 40. The user input device 59 may be any device capable of transforming mechanical, optical, or electrical signals into a data signal capable of being transmitted with the communication path 54. Specifically, the user input device 59 may include any number of movable objects that transform physical motion into a data signal that can be transmitted over the communication path 54 such as, for example, a button, a switch, a knob, a microphone or the like. In some embodiments, the display 58 and the user input device 59 are combined as a single module and operate as an audio head unit or an infotainment system within the vehicle 10. However, it is noted, that the display 58 and the user input device 59 may be separate from one another. The user input device 59 may allow a vehicle operator to adjust and the position and orientation of the light diverting member 44.

In some embodiments, the light diverting system 40 further includes network interface hardware 66 for communicatively coupling the light diverting system 40 with a network 67. The network interface hardware 66 can be communicatively coupled to the communication path 54 and can be any device capable of transmitting and/or receiving data via the network 67. Accordingly, the network interface hardware 66 can include a communication transceiver for sending and/or receiving any wired or wireless communication. For example, the network interface hardware 66 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 66 includes hardware configured to operate in accordance with the Bluetooth wireless communication protocol. In another embodiment, network interface hardware 66 may include a Bluetooth send/receive module for sending and receiving Bluetooth communications to/from a mobile device 60.

The light diverting system 40 may communicate, through the network interface hardware 66, with the network 67 to communicatively couple the light diverting system 40 with the mobile device 60. In one embodiment, the network 67 is a personal area network that utilizes Bluetooth technology to communicatively couple the light diverting system 40 and the mobile device 60. In other embodiments, the network 67 may include one or more computer networks (e.g., a personal area network, a local area network, or a wide area network), cellular networks, satellite networks and/or a global positioning system and combinations thereof. Accordingly, the light diverting system 40 can be communicatively coupled to the network 67 via wires, via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

In some embodiments, the mobile device 60 may be included as a user input device. The mobile device 60 may include a processor and a memory module. The processor can execute logic to communicate with the light diverting system 40 in order to facilitate sending instructions to the light diverting system 40 from the mobile device 60 to adjust the light diverting apparatus 42. The mobile device 60 may be configured with wired and/or wireless communication functionality for communicating with the light diverting system 40. In embodiments described herein, the mobile device 60 may include mobile phones, smartphones, personal digital assistants, dedicated mobile media players, mobile personal computers, laptop computers, and/or any other mobile devices capable of being communicatively coupled with the light diverting system 40. It is noted, that in this embodiment, the light diverting system 40 may communicate with the mobile device 60 even while the mobile device 60 is outside of a cabin of the vehicle 10. In this way, the light diverting apparatus 42 may be adjusted with the mobile device 60 from outside of the vehicle 10. For example, a vehicle operator may need to exit the vehicle 10 to view an illuminated region that is illuminated using the light diverting apparatus 42 and the light source 70.

The light diverting system 40 may further include the display 58 for providing visual output such as, for example, maps, navigation, entertainment, information, image data from the camera 80, or a combination thereof. The display 58 is coupled to the communication path 54. Accordingly, the communication path 54 communicatively couples the display 58 to other modules of the light diverting system 40. The display 58 may include any medium capable of transmitting an optical output such as, for example, a cathode ray tube, light emitting diodes, a liquid crystal display, a plasma display, or the like. Moreover, the display 58 may be a touchscreen that, in addition to providing optical information, detects the presence and location of a tactile input upon a surface of or adjacent to the display 58. Accordingly, the display 58 may receive mechanical input directly upon the optical output provided by the display 58. As such, the display 58 may be included as a user input device 59. Additionally, it is noted that the display 58 can include a processor and a memory module.

The light diverting system 40 may further include the camera 80 coupled to the communication path 54 such that the communication path 54 communicatively couples the camera 80 to other modules of the light diverting system 40. In one embodiment, the camera 80 may be part of the light diverting apparatus 42 (FIG. 3). The camera 80 may include any devices having an array of sensing devices (e.g., pixels) capable of capturing image data from an environment of the vehicle 10. The camera 80 may have any resolution. As noted above, image data received from the camera 80 may be displayed on the display 58. The image data may be of a region that is illuminated by the light diverting member 44. In some embodiments, the light diverting system 40 may activate the camera 80 upon receiving instructions from the user input device 59.

The light diverting system 40 may further include a drive mode sensor 90 communicatively coupled over the communication path 54 to other vehicle modules. The drive mode sensor 90 may be configured to detect a particular driving mode of the vehicle 10. For example, the drive mode sensor 90 may detect whether the vehicle 10 has been placed in a park driving mode (e.g., park) and output a driving mode signal regarding the same. In one embodiment, the drive mode sensor 90 may be communicatively coupled with a gear shifter of the vehicle 10 and may output a driving mode signal indicative of the gear in which the vehicle 10 has been placed. The light diverting system 40, based on the driving mode of the vehicle 10, may execute logic to automatically return the light diverting apparatus 42 from the extended configuration to the stowed configuration or to allow/disallow use of the light diverting system 40. For example, the light diverting system 40 may only allow operation of the light diverting apparatus with the vehicle 10 in park.

FIG. 3 also illustrates operation of the light diverting system 40 including the light diverting apparatus 42 and light diverting member 44. A light beam $B_1$ provided by the light source 70 of the headlamp assembly 30 is directed toward the light diverting member 44. As indicated above, the light diverting member 44 has a reflective surface 46, such as a mirror surface that is used to reflect the light beam $B_1$ in a different direction depending on the angle of the light diverting member 44. For example, a planar reflective surface 46 will provide a light beam $B_2$ that is reflected in a predictable manner based on the law of reflection. While a planar reflective surface is shown, other suitable surface shapes may be used, such as curved. In some embodiments, the processor 55 can execute logic that determines the angle of incidence of the reflected light beam $B_2$ and adjust the orientation of the light diverting member 44 based on user input.

Figure 4:
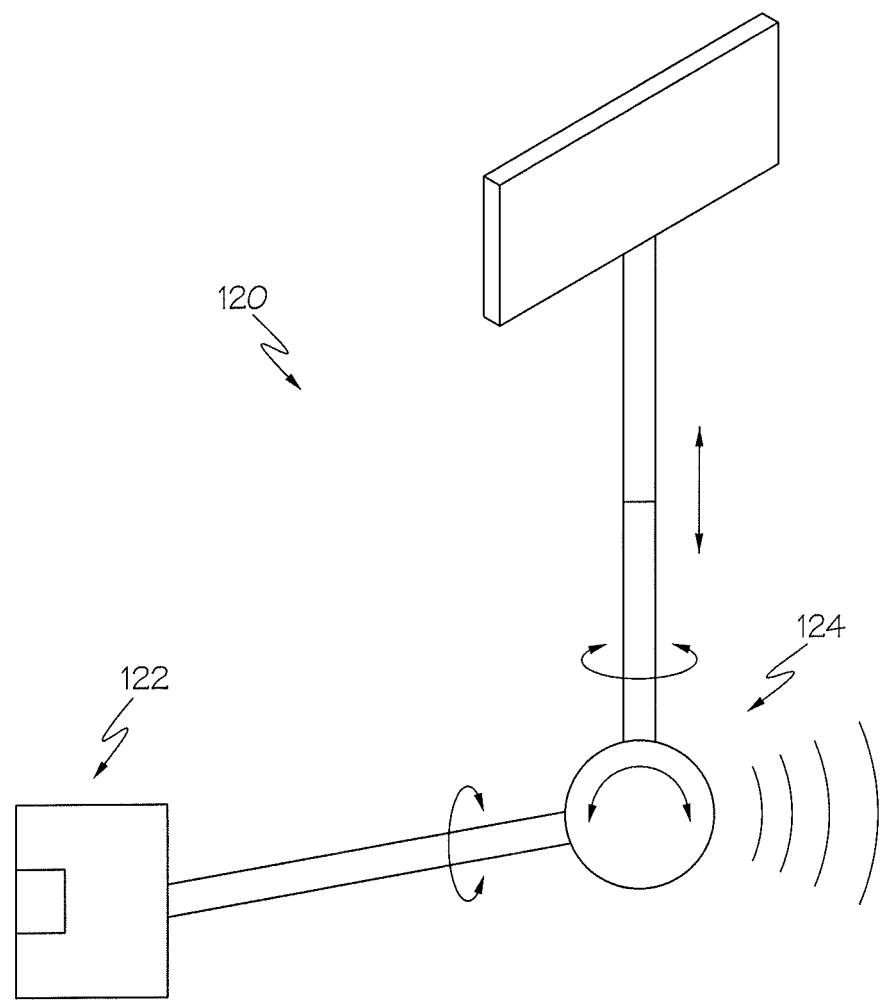
FIG. 4 illustrates another embodiment of a light diverting system including light diverting apparatus, according to one or more embodiments shown and described herein.

FIG. 3 illustrates an embodiment of the light diverting apparatus 42 that is operated as part of the vehicle 10. Referring to FIG. 4, in another embodiment, a light diverting apparatus 120 may be assembled separate from a vehicle and thereafter attached thereto using an attachment assembly 122. The light diverting apparatus 120 may provide its own light diverting system, generally indicated as element 124 that can include many of the components of the light diverting system 40 described above. For example, the light diverting system 124 may include The light diverting system 40 includes a communication path, a processor, a memory module, the light diverting apparatus 120, network interface hardware and use input from a user input device to adjust orientation of the light diverting apparatus 120. The attachment assembly 122 may attach to the front end assembly of the vehicle or any other suitable location. In some embodiments, the attachment assembly may be connected to support structures other than a vehicle where diverting light from one direction to another direction from a light source is desired.

The above-described light diverting systems provide a light diverting apparatus including a light diverting member that is used to divert light directed along one direction in a different direction. The light diverting apparatuses may be controlled by actuators and/or manually to place the light diverting apparatuses and light diverting members in multiple desired positions and orientations depending on a desired angle of incidence. The above-described light diverting systems may be useful for diverting light from a headlamp assembly of a vehicle as such light is typically directed in a forward direction.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A light diverting system for diverting light from a headlamp assembly of a vehicle, the light diverting system comprising:
   a processor;
   a light diverting apparatus comprising an actuator communicatively coupled to the processor and a light diverting member comprising a reflective surface configured to reflect light from a light source within the headlamp assembly, wherein the light diverting apparatus comprises an actuation arm comprising an articulating location, the actuation arm positioning the reflective surface forward of the headlamp assembly to reflect light from the light source having exited the headlamp assembly;
   a memory module communicatively coupled to the processor that stores logic that, when executed by the processor, causes the system to:
   receive user instructions from a user; and
   adjust a position of the light diverting member using the light diverting apparatus based on the user instructions.

2. The light diverting system of claim 1, wherein the light diverting apparatus has an extended configuration where the reflective surface reflects light from the light source and a stowed configuration where the light diverting member including the reflective surface is stowed within a housing of the vehicle.

3. The light diverting system of claim 1, wherein the actuation arm comprises multiple articulating locations.

4. The light diverting system of claim 1 further comprising:
a camera communicatively coupled to the processor and configured to capture image data of a region illuminated by the light diverting apparatus; and
a display communicatively coupled to the processor, wherein the logic executed by the processor further causes the system to:
receive the image data from the camera; and
display the image data on the display.

5. The light diverting system of claim 1 further comprising a drive mode sensor communicatively coupled to the processor and configured to output a drive mode signal, wherein the logic executed by the processor further causes the system to:
receive the drive mode signal of the drive mode sensor;
determine a drive mode of the vehicle based on the drive mode signal; and
automatically adjust the light diverting apparatus with the actuator when it is determined that the vehicle is in drive.

6. The light diverting system of claim 1 further comprising network interface hardware communicatively coupled to the processor and a mobile device communicatively coupled to the processor by the network interface hardware.

7. A vehicle comprising:
a processor;
a headlamp assembly comprising a light source;
a light diverting apparatus comprising an actuator communicatively coupled to the processor and a light diverting member comprising a reflective surface configured to reflect light from the light source; within the headlamp assembly, wherein the light diverting apparatus comprises an actuation arm comprising an articulation location, the actuation arm positioning the reflective surface forward of the headlamp assembly to reflect light from the light source having exited the headlamp assembly;
a memory module communicatively coupled to the processor that stores logic that, when executed by the processor, causes the processor to:
receive user instructions from a user; and
adjust a position of the light diverting member using the light diverting apparatus based on the user instructions.

8. The vehicle of claim 7, wherein the light diverting apparatus has an extended configuration where the reflective surface reflects light from the light source and a stowed configuration where the light diverting member including the reflective surface is stowed within a housing of the vehicle.

9. The vehicle of claim 7, wherein the actuation arm comprises multiple articulating locations.

10. The vehicle of claim 7 further comprising:
a camera communicatively coupled to the processor and configured to capture image data of a region illuminated by the light diverting apparatus; and
a display communicatively coupled to the processor, wherein the logic executed by the processor further causes the system to:
receive the image data from the camera; and
display the image data on the display.

11. The vehicle of claim 7 further comprising a drive mode sensor communicatively coupled to the processor and configured to output a drive mode signal, wherein the logic executed by the processor further causes the system to:
receive the drive mode signal of the drive mode sensor;
determine a drive mode of the vehicle based on the drive mode signal; and
automatically adjust the light diverting apparatus with the actuator when it is determined that the vehicle is in drive.

12. The vehicle of claim 7 further comprising network interface hardware communicatively coupled to the processor, and a mobile device communicatively coupled to the processor by the network interface hardware.

13. A method for diverting light from a headlamp assembly of a vehicle, the method comprising:
positioning a reflective surface of a light diverting apparatus of the vehicle in front of a light source of the headlamp assembly using an actuator; and
adjusting a position of the reflective surface positioned in front of the light source of the headlamp assembly using the light diverting apparatus based on user instructions
wherein the light diverting apparatus comprises an actuation arm comprising an articulation location, the actuation arm positioning the reflective surface forward of the headlamp assembly to reflect light from the light source having exited the headlamp assembly.

14. The method of claim 13, wherein the light diverting apparatus has an extended configuration where the reflective surface reflects light from the light source and a stowed configuration where the light diverting member including the reflective surface is stowed within a housing of the vehicle.

15. The method of claim 13, wherein the actuation arm comprises multiple articulating locations.

16. The method of claim 13 further comprising:
a camera communicatively coupled to the processor and configured to capture image data of a region illuminated by the light diverting apparatus; and
a display communicatively coupled to the processor, wherein the method further comprises:
receiving the image data from the camera; and
displaying the image data on the display.

17. The method of claim 13 further comprising network interface hardware communicatively coupled to the processor and a mobile device communicatively coupled to the processor by the network interface hardware.

* * * * *